(12) United States Patent
Hong

(10) Patent No.: US 11,397,114 B2
(45) Date of Patent: Jul. 26, 2022

(54) TEMPERATURE SENSOR AND DISPLAY DEVICE INCLUDING THE SAME

(71) Applicant: SAMSUNG DISPLAY CO., LTD., Yongin-si (KR)

(72) Inventor: Won Ki Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/213,809

(22) Filed: Mar. 26, 2021

(65) Prior Publication Data
US 2022/0090968 A1 Mar. 24, 2022

(30) Foreign Application Priority Data

Sep. 22, 2020 (KR) .......................... 10-2020-0122599

(51) Int. Cl.
G01K 7/42 (2006.01)
G01K 7/16 (2006.01)
G06F 3/041 (2006.01)
G01K 13/20 (2021.01)
G01K 1/02 (2021.01)

(52) U.S. Cl.
CPC ............... *G01K 7/42* (2013.01); *G01K 1/028* (2013.01); *G01K 7/16* (2013.01); *G01K 13/20* (2021.01); *G06F 3/0412* (2013.01); *G06F 2203/04105* (2013.01)

(58) Field of Classification Search
CPC ........ G06F 3/0412; G06F 2203/04105; G01K 13/20; G01K 7/16; G01K 1/028; G01K 7/42
See application file for complete search history.

(56) References Cited

U.S. PATENT DOCUMENTS

| | | | |
|---|---|---|---|
| 8,695,441 B2 | 4/2014 | Kim et al. | |
| 8,770,035 B2 | 7/2014 | Yamada et al. | |
| 2016/0349134 A1* | 12/2016 | Jeon | ....................... A61B 34/00 |
| 2017/0344165 A1* | 11/2017 | Heo | ..................... H01L 27/323 |
| 2019/0155450 A1* | 5/2019 | Kim | .......................... G01L 1/26 |
| 2020/0225099 A1* | 7/2020 | Li | ............................. G01L 1/18 |

* cited by examiner

Primary Examiner — Hong Zhou
(74) Attorney, Agent, or Firm — F. Chau & Associates, LLC

(57) ABSTRACT

The temperature sensor includes a first sensor including a sensing element configured to measure a first resistance value of the sensing element in a first state, and also configured to measure a second resistance value of the sensing element in a second state different from the first state, a second sensor configured to measure a touch pressure corresponding to a user's touch input in the second state, a compensator configured to calculate a first change rate based on the first resistance value and the second resistance value, and also configured to calculate a change rate of a correction resistance value by correcting the first change rate based on the touch pressure, and a temperature calculator configured to calculate a temperature value based on the change rate of the correction resistance value.

20 Claims, 9 Drawing Sheets

TEMPERATURE SENSOR AND DISPLAY DEVICE INCLUDING THE SAME

CROSS-REFERENCE TO RELATED APPLICATION

This application claims priority under 35 U.S.C. § 119 to Korean Patent Application No. 10-2020-0122599 filed in the Korean Intellectual Property Office on Sep. 22, 2020, the entire contents of which are incorporated by reference herein.

TECHNICAL FIELD

The present invention relates to a temperature sensor and a display device including the same.

DISCUSSION OF THE RELATED ART

With increasing interest in information display technologies and increasing demand for portable electronic devices, research and commercialization of display devices have been focused on.

In addition to displaying images, recent display devices are able to measure biometric information such as a user's body temperature and checking certain health conditions. However, in some cases, these recent devices may lack accuracy and reliability in measuring biometrics when the user touches the device with varying pressure.

SUMMARY

Aspects of the present disclosure provide a temperature sensor capable of accurately measuring a user's body temperature.

Another aspect of the present disclosure is to provide a display device including the temperature sensor.

A temperature sensor according to embodiments includes a first sensor including a sensing element configured to measure a first resistance value of the sensing element in a first state, and also configured to measure a second resistance value of the sensing element in a second state different from the first state, a second sensor configured to measure a touch pressure corresponding to a user's touch input in the second state, a compensator configured to calculate a first change rate based on the first resistance value and the second resistance value, and also configured to calculate a change rate of a correction resistance value by correcting the first change rate based on the touch pressure, and a temperature calculator configured to calculate a temperature value based on the change rate of the correction resistance value.

In an embodiment of, the user's touch input may be provided to the first sensor in the second state, and the user's touch input may be not provided to the first sensor in the first state.

In an embodiment, the compensator may calculate the first change rate in correspondence with a ratio of the second resistance value to the first resistance value.

In an embodiment, the compensator may calculate a second change rate based on the touch pressure, and may calculate the change rate of the correction resistance value based on the first change rate and the second change rate.

In an embodiment, the compensator may calculate the change rate of the correction resistance value by subtracting the second change rate from the first change rate.

In an embodiment, the second change rate may correspond to a change rate of the resistance value of the sensing element according to the touch pressure.

In an embodiment, the temperature sensor may further include a memory including a look-up table configured to store the temperature value corresponding to the change rate of the correction resistance value.

In an embodiment, the temperature sensor may further include a memory including a look-up table configured to store the second change rate corresponding to the touch input.

In an embodiment, the second sensor may be disposed on a surface facing a contact surface between the first sensor and the user.

In an embodiment, the first sensor may include a first sensor substrate, the sensing element disposed on the first sensor substrate, an insulating layer disposed on the first sensor substrate and the sensing element to cover the sensing element; and first sensor electrodes disposed on the insulating layer and including passing through the insulating layer to be connected to the sensing element.

In an embodiment, the first sensor electrodes may be connected to a measurement circuit that measures the first resistance value and the second resistance value of the sensing element.

In an embodiment, the second sensor may include a second sensor substrate, a third sensor substrate disposed on the second sensor substrate, and a sensor layer disposed between the second sensor substrate and the third sensor substrate.

In an embodiment, the sensor layer may include a second sensor electrode, a third sensor electrode disposed on the second sensor electrode, and an intermediate layer disposed between the second sensor electrode and the third sensor electrode.

In an embodiment, the sensing element may include at least one selected from Pt, Ni, Cu, and polysilicon.

A display device according to embodiments includes a touch sensing unit sensing a user's touch input, a display panel disposed on the touch sensing unit, including a display area and a non-display area, and configured to display an image in the display area, and a temperature sensor configured to calculate a temperature value corresponding to the user's touch input. The temperature sensor may include a first sensor including a sensing element, configured to measure a first resistance value of the sensing element in a first state, and also configured to measure a second resistance value of the sensing element in a second state different from the first state; a second sensor configured to measure a touch pressure corresponding to the touch input in the second state; a compensator configured to calculate a first change rate based on the first resistance value and the second resistance value, and also configured to calculate a change rate of a correction resistance value by correcting the first change rate based on the touch pressure; and a temperature calculator configured to calculate a temperature value based on the change rate of the correction resistance value.

In an embodiment, the temperature sensor may overlap the non-display area.

In an embodiment, the touch sensing unit may overlap the display area and the non-display area, the touch sensing unit overlapping the non-display area may correspond to the second sensor, and the first sensor may overlap the second sensor.

In an embodiment, the temperature sensor may overlap the display area.

In an embodiment, the touch sensing unit may overlap the display area, the touch sensing unit overlapping on the display area may correspond to the second sensor, and the first sensor may overlap the second sensor.

In an embodiment, the display panel may include pixels disposed on the display area, and the first sensor may be disposed not to overlap the pixels.

The temperature sensor according to the embodiments may measure a change rate of a resistance value and a touch pressure of the sensing element included in the first sensor in response to a user's touch, and may correct the measured change rate of the resistance value of the sensing element based on the touch pressure, thereby improving accuracy of temperature sensing.

The display device according to the embodiments may include the temperature sensor, thereby sensing more accurately the user's temperature (i.e., body temperature).

It should be understood that aspects are not limited by the foregoing, and various changes and modifications may be made without departing from the spirit and scope of the invention.

DETAILED DESCRIPTION

Figure 1:
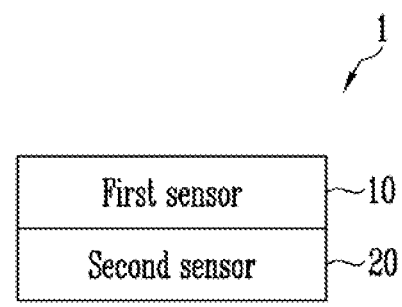
FIG. 1 is a cross-sectional view schematically illustrating a temperature sensor according to embodiments.

It will be apparent to those skilled in the art that various modifications and variations can be made in the present disclosure without departing from the spirit or scope of the disclosure, and specific embodiments are exemplified in the drawings and explained in the detailed description. Thus, it is intended that the present invention covers modifications and variations of this invention provided they come within the scope and their equivalents.

Like reference numerals may designate like elements throughout the specification. In the accompanying drawings, dimensions of structures may be exaggerated for clarity and ease of description. The terms, 'first', 'second' and the like may be simply used for description of various constituent elements, but those meanings may not be limited to the restricted meanings. The above terms are used only for distinguishing one constituent element from other constituent elements. For example, a first constituent element may be referred to as a second constituent element and similarly, the second constituent element may be referred to as the first constituent element within the scope of the appended claims. Description of the singular form of an element, unless explicitly described to the contrary, may be interpreted as the plural meaning.

In the specification, the word "comprise" or "include" is used to specify existence of a feature, a numbers, a process, an operation, a constituent element, a part, or a combination thereof, and it will be understood that existence or additional possibility of one or more other features or numbers, processes, operations, constituent elements, parts, or combinations thereof are not excluded in advance.

In addition, when one part is referred to as being 'connected' or 'coupled' to another part, it should be understood that the former can be 'directly connected/coupled' to the latter, or 'indirectly connected/coupled' to the latter via an intervening part.

In addition, it will be understood that when an element such as a layer, film, region, or substrate is referred to as being "on" another element, it can be directly on the other element or intervening elements may also be present. In the specification, it will be understood that when an element such as a layer, film, region, or substrate is referred to as being disposed "on" another element, the disposed direction is not limited to an upper direction and include a side direction or a lower direction. In contrast, it will be understood that when an element such as a layer, film, region, or substrate is referred to as being "beneath" another element, it can be directly beneath the other element or intervening elements may also be present.

Hereinafter, embodiments will be described in further detail with reference to the attached drawings.

FIG. 1 is a cross-sectional view schematically illustrating a temperature sensor according to embodiments.

Referring to FIG. 1, the temperature sensor 1 may sense a user's temperature (i.e., body temperature) in response to a user's touch.

In an embodiment, the temperature sensor 1 may include a first sensor 10.

The first sensor 10 may measure a resistance value (or a change rate of a resistance value) of the sensing element, and the temperature sensor 1 may sense a temperature based on the measured resistance value. To this end, the first sensor 10 may include a sensing element whose resistance value changes with a temperature change of a contact surface between the user and the first sensor 10 according to the user's touch. For example, the resistance value of the sensing element may change linearly in proportion to the temperature change of the contact surface.

The temperature sensor 1 may sense a temperature according to the measured change rate of a resistance value, which, as described above, may correspond to the temperature change of a contact surface between the user and the first sensor 10. For example, the temperature sensor 1 may be a resistance temperature detector (RTD) temperature sensor.

The sensing element may include a material that has a relatively large change in resistance when its temperature changes. For example, the sensing element may include a semiconductor material such as polysilicon. However, the present disclosure is not necessarily limited thereto. For example, the sensing element may include platinum (Pt), nickel (Ni), copper (Cu), or the like.

Regarding a sensing element (e.g., polysilicon) of the first sensor 1, since the sensing element acts as a resistor in response to an applied voltage, a voltage value (or a current value) measured according to a temperature change may be different from the resistance value. However, the voltage value may be directly related to the resistance, and accordingly, the first sensor 10 may measure the change rate of the resistance value by measuring a voltage.

For example, when the sensing element includes polysilicon, the sensing element may have two temperature coefficient of resistance (TCR) characteristics. Here, the temperature coefficient of resistance characteristic may refer to a change rate of a resistance value according to a temperature change. When the resistance value increases as the temperature increases, the TCR may be called a positive temperature coefficient of resistance (positive TCR), and when the resistance value decreases as the temperature increases, is the TCR may be called a negative temperature coefficient of resistance (negative TCR).

According to an intragrain resistance, which indicates the resistance value due to doping, as the temperature increases, the sensing element may have a positive TCR that increases the resistance value of silicon due to an increase in phonon scattering of silicon.

In addition, according to a grain boundary resistance, which represents the resistance value of a barrier between grain boundaries, as the temperature increases, the sensing element may have a negative temperature coefficient of resistance (TCR) that decreases the resistance value of silicon.

Accordingly, in a case of polysilicon, the temperature coefficient of resistance and sheet resistance value can be adjusted by controlling doping concentration and grain size. The temperature sensor 1 may further improve temperature sensing sensitivity and accuracy by adjusting a temperature coefficient of resistance and a sheet resistance value of polysilicon (i.e., the sensing element).

However, the resistance value of the sensing element may change due to not only temperature change but also other external factors. For example, the resistance value of the sensing element may change according to the touch pressure applied to the first sensor 10 (or the temperature sensor 1) by a user's touch. In this case, when the first sensor 10 does not account for the change rate of the resistance value of the sensing element according to the touch pressure, the sensing accuracy of the temperature sensor 1 may be reduced.

Accordingly, the temperature sensor 1 according to the embodiments may correct the resistance value (or the change rate of the resistance value) measured by the first sensor 10 by measuring the touch pressure and adjusting the temperature measurement accordingly. To this end, in an embodiment, the temperature sensor 1 may further include a second sensor 20 for sensing the touch pressure.

The second sensor 20 is a pressure sensor, and may include at least one of: a force sensitive device including a force sensitive material or a force sensitive resistor, and a deformation sensitive device including a strain gauge, a piezo-resistive device, a piezoelectric device, and a gap capacitance sensitive device. In addition, the second sensor 20 may include various pressure sensing elements capable of sensing pressure applied from the outside, and in the present disclosure, the type of the second sensor 20 is not particularly limited.

The second sensor 20 may be disposed on a rear surface (e.g., a surface opposite the surface of the first sensor 10 that contacts the user) of the first sensor 10.

According to embodiments, the temperature sensor 1 may further include a window disposed on the first sensor 10. The window may be attached on the first sensor 10 by an adhesive layer. Here, the adhesive layer may include at least one of an optical clear adhesive (OCA) and an optical clear resin (OCR).

As described with reference to FIG. 1, the temperature sensor 1 according to the embodiments can measure a resistance value (or a change rate of a resistance value) of a sensing element included in the first sensor 10 and a touch pressure, and correct the measured resistance value (or the change rate of the resistance value) of the sensing element based on the touch pressure, thereby improving accuracy of the temperature sensing.

Hereinafter, the configuration of the first sensor 10 will be described in detail with reference to FIGS. 2 to 3B, and the configuration of the second sensor 20 will be described in detail with reference to FIGS. 4 to 7, and the operation of the temperature sensor 1 will be described in detail with reference to FIGS. 8 to 9B.

Figure 2:
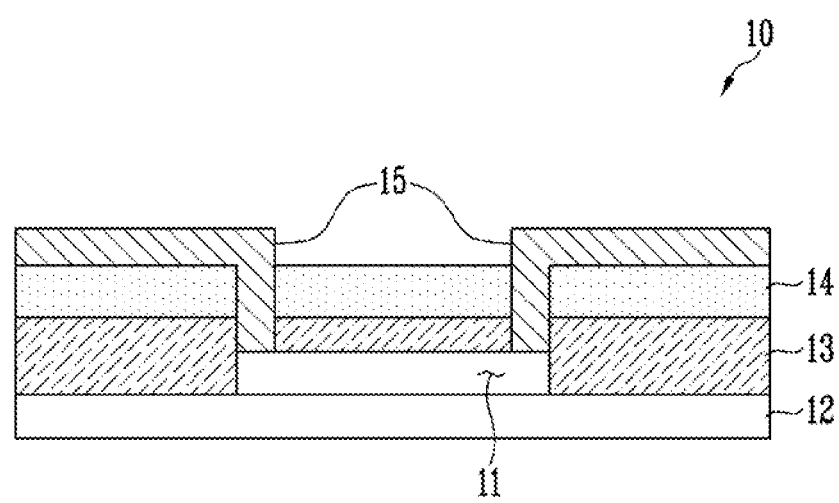
FIG. 2 is a cross-sectional view schematically illustrating an example of a first sensor included in the temperature sensor of FIG. 1.
Figure 3A:
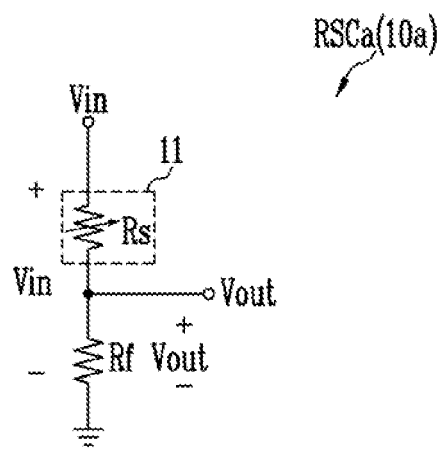
FIGS. 3A and 3B are circuit diagrams for describing examples of a measurement circuit included in the first sensor of FIG. 2.
Figure 3B:
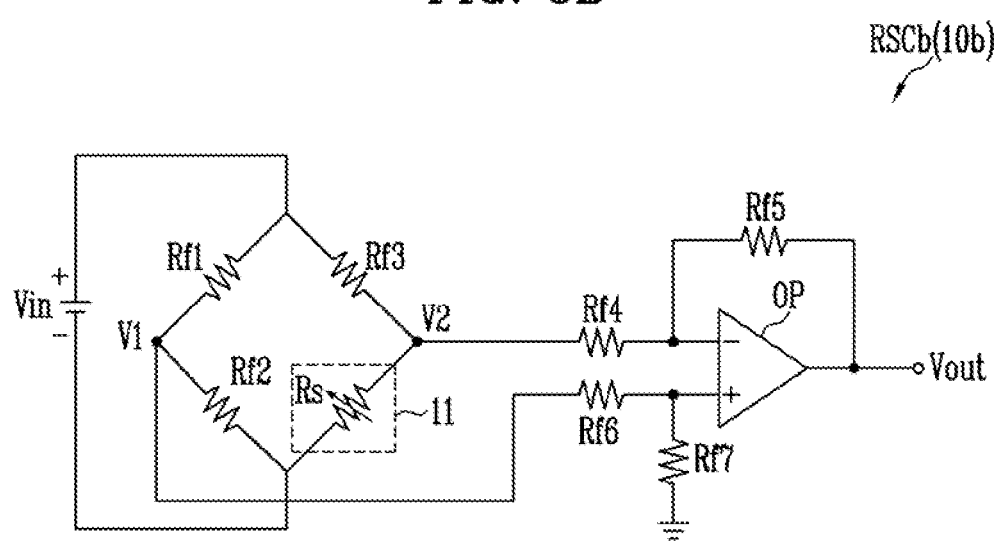

FIG. 2 is a cross-sectional view schematically illustrating an example of a first sensor included in the temperature sensor of FIG. 1, and FIGS. 3A and 3B are circuit diagrams for describing examples of a measurement circuit included in the first sensor of FIG. 2.

Referring to FIG. 2, the first sensor 10 may include a sensing element 11, a first sensor substrate 12, an insulating layer (e.g., a first insulating layer 13, a second insulating layer 14), and first sensor electrodes 15.

The first sensor substrate 12 may be a rigid substrate or a flexible substrate capable of being bent, folded, rolled, or the like. The first sensor substrate 12 may be made of an insulating material such as glass, quartz, or polymer resin. The polymer resin may include at least one of polyethersulphone (PES), polyacrylate (PA), polyarylate (PAR), polyetherimide (PEI), polyethylene napthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof. Additionally or alternatively, the first sensor substrate 12 may include a metal material.

The sensing element 11 may be disposed on the first sensor substrate 12. For example, the sensing element 11 may be substantially the same as the sensing element described with reference to FIG. 1.

The insulating layer may include a first insulating layer 13 and a second insulating layer 14.

The first insulating layer 13 may be disposed on the first sensor substrate 12 and the sensing element 11. The first insulating layer 13 may cover the sensing element 11.

The first insulating layer 13 may include an inorganic layer. For example, the first insulating layer 13 may include at least one of silicon nitride, silicon oxy nitride, silicon oxide, titanium oxide, or aluminum oxide.

The second insulating layer 14 may be disposed on the first insulating layer 13. The second insulating layer 14 may be made of a material that is substantially the same as or similar to the first insulating layer 13. For example, the second insulating layer 14 may include an inorganic layer. For example, the second insulating layer 14 may include at least one of silicon nitride, silicon oxy nitride, silicon oxide, titanium oxide, or aluminum oxide.

According to some embodiments, the second insulating layer 14 may be omitted.

The first sensor electrodes 15 may be disposed on the second insulating layer 14. In an embodiment, the first sensor electrodes 15 may be made of a single layer or multiple layers made of one of molybdenum (Mo), niobium (Nb), aluminum (Al), chromium (Cr), gold (Au), titanium (Ti), nickel (Ni), neodymium (Nd), or copper (Cu) or an alloy thereof.

The first sensor electrodes 15 may be connected to the sensing element 11 through a contact hole passing through the first insulating layer 13 and the second insulating layer 14. Each of the first sensor electrodes 15 may be connected to both ends of the sensing element 11.

The first sensor electrodes 15 may be connected to a measurement circuit for measuring a resistance value of the sensing element 11. The first sensor 10 may measure the resistance value of the sensing element 11 using the measurement circuit. For example, the measurement circuit may be implemented as a voltage divider circuit, a Wheatstone bridge circuit, or the like.

For example, referring to FIG. 3A, the measurement circuit RSCa of the first sensor 10a may include a sensor resistor Rs and a reference resistor Rf connected between an input terminal to which an input voltage Vin is applied and the ground.

The sensor resistor Rs may correspond to the resistance of the sensing element 11. That is, the resistance value of the sensor resistor Rs may change according to temperature and pressure in response to a user's touch.

The reference resistor Rf may have a constant resistance value.

The measurement circuit RSCa may measure an output voltage Vout of an output terminal connected to a node between the sensor resistor Rs and the reference resistor Rf. The output voltage Vout may correspond to a voltage value obtained by dividing the input voltage Vin according to the voltage distribution by the sensor resistor Rs and the reference resistor Rf.

Here, since the resistance value of the reference resistor Rf is a fixed value, the measurement circuit RSCa can measure the resistance value of the sensor resistor Rs by comparing the output voltage Vout to the input voltage Vin.

In another example, referring to FIG. 3B, the measurement circuit RSCb of the first sensor 10b may include the Wheatstone bridge circuit connected to both ends of the input voltage Vin, and a differential amplifier circuit that is connected to the Wheatstone bridge circuit and outputs the output voltage Vout to an output terminal.

The Wheatstone bridge circuit may include a sensor resistor Rs and first to third reference resistors Rf1, Rf2, and Rf3. Here, since the sensor resistor Rs corresponds to the resistance of the sensing element 11, the resistance value may change according to temperature and pressure in response to a user's touch. Each of the first to third reference resistors Rf1, Rf2, and Rf3 may have a constant resistance value.

According to the configuration of the Wheatstone bridge circuit, a first voltage V1 of a node between the first reference resistor Rf1 and the second reference resistor Rf2 may have a constant value corresponding to the constant input voltage Vin. However, since the resistance value of the sensor resistor Rs changes according to temperature and pressure, a second voltage V2 of a node between the third reference resistor Rf3 and the sensor resistor Rs may change in correspondence with the temperature and pressure.

The differential amplifier circuit may include fourth to seventh reference resistors Rf4, Rf5, Rf6, and Rf7 and an amplifier OP. The differential amplifier circuit is connected to the Wheatstone bridge circuit and amplifies a difference between the first voltage V1 and the second voltage V2, and outputs an output voltage Vout.

The first sensor 10 may include the measurement circuit RSCa having a relatively simple structure as shown in FIG. 3A, or may include the Wheatstone bridge circuit and the differential amplifier circuit as shown in FIG. 3B, thereby measuring the resistance value of the sensor resistor Rs with increased precision. However, the configuration of the measurement circuit of the first sensor 10 is not necessarily limited thereto, and may be implemented with various known resistance measurement circuits.

Figure 4:
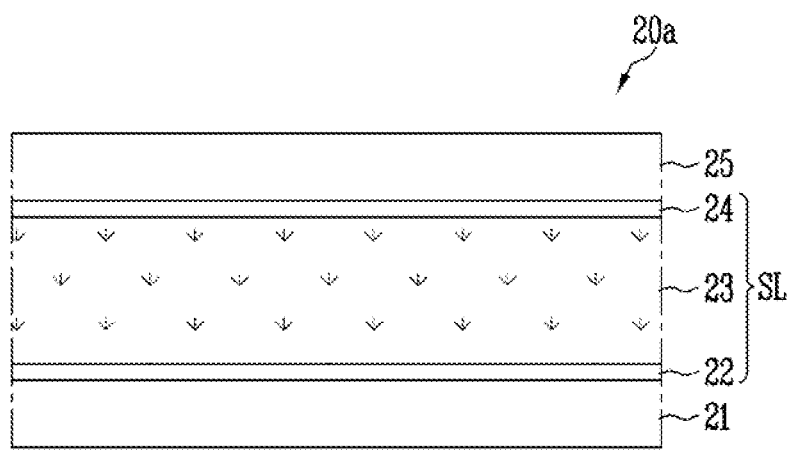
FIG. 4 is a cross-sectional view schematically illustrating an example of a second sensor included in the temperature sensor of FIG. 1.

FIG. 4 is a cross-sectional view schematically illustrating an example of a second sensor included in the temperature sensor of FIG. 1. In FIG. 4, a pressure sensor of a gap capacitance sensing method is shown.

Referring to FIG. 4, the second sensor 20a may include a second sensor substrate 21, a third sensor substrate 25, and a sensor layer SL disposed between the second sensor substrate 21 and the third sensor substrate 25. Here, the second sensor substrate 21 and the third sensor substrate 25 may be made of a material that is substantially the same as or similar to the first sensor substrate 12 described with reference to FIG. 2.

The sensor layer SL may include a second sensor electrode 22, a third sensor electrode 24, and an elastic layer 23 (or an intermediate layer) disposed between the second sensor electrode 22 and the third sensor electrode 24. Here, the second sensor electrode 22 and the third sensor electrode 24 may be made of a material that is substantially the same as or similar to the first sensor electrodes 15 described with reference to FIG. 2.

At least one wire may be connected to each of the second sensor electrode 22 and the third sensor electrode 24, and the wire(s) may be connected to an external driving circuit.

According to embodiments, a driving voltage for driving the second sensor 20a may be applied to one of the second and third sensor electrodes 22 and 24, and a detection signal corresponding to the driving voltage may be output from the other thereof. The second sensor 20a may measure the touch pressure by analyzing the detection signal.

The second and third sensor electrodes 22 and 24 may be spaced apart from each other with the elastic layer 23 interposed therebetween, and capacitance may be formed between the second and third sensor electrodes 22 and 24. The capacitance between the second and third sensor electrodes 22 and 24 may change according to a separation distance.

For example, when a touch input is provided directly or indirectly on the second sensor 20a, a distance between the second sensor electrode 22 and the third sensor electrode 24 may change. Accordingly, the capacitance between the second sensor electrode 22 and the third sensor electrode 24 may change. Accordingly, when the touch input is provided, the second sensor 20a may measure the touch pressure by measuring a change amount in capacitance between the second and third sensor electrodes 22 and 24.

The elastic layer 23 may be disposed between the second sensor electrode 22 and the third sensor electrode 24. For example, one surface of the elastic layer 23 may contact the second sensor electrode 22, and the other surface of the elastic layer 23 may contact the third sensor electrode 24.

The elastic layer 23 may dampen external impacts and may have an elastic force for this purpose. For example, the elastic layer 23 may be deformed by external pressure, and the elastic layer 23 may have an elastic force capable of being restored to an original state when the external pressure is removed. In addition, the elastic layer 23 may have insulating properties to prevent an electrical short between the second sensor electrode 22 and the third sensor electrode 24.

According to embodiments, the elastic layer 23 may be made of a porous polymer. For example, the elastic layer 23 may be provided in a form of a foam such as a sponge. For example, the elastic layer 23 may include thermoplastic elastomers, polystyrene, polyolefin, polyurethane thermoplastic elastomers, polyamides, synthetic rubbers, polydimethylsiloxane, polybutadiene, polyisobutylene, poly(styrene-butadienestyrene), polyurethanes, polychloroprene, polyethylene, silicone, and the like, and combinations thereof. However, the material constituting the elastic layer 23 is not necessarily limited thereto, and other materials having elasticity in addition thereto may be used as the material constituting the elastic layer 23.

Figure 5A:
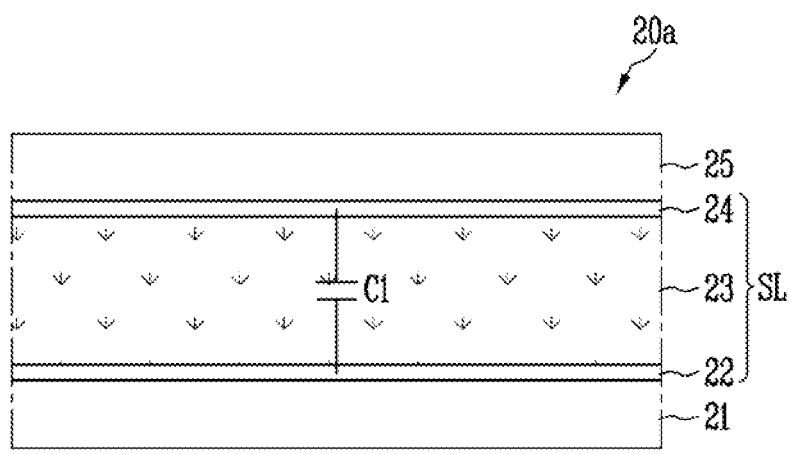
FIGS. 5A and 5B are cross-sectional views for describing examples of an operation of the second sensor of FIG. 4.
Figure 5B:
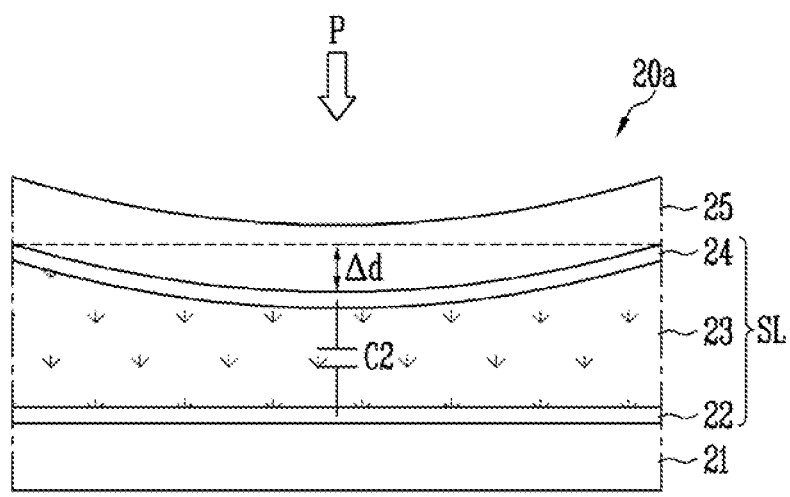

FIGS. 5A and 5B are cross-sectional views for describing examples of an operation of the second sensor of FIG. 4. Here, FIG. 5A shows a state in which the touch pressure P is not applied to the second sensor 20a, and FIG. 5B shows a state in which the touch pressure P is applied to the second sensor 20a.

Referring to FIG. 5A, when the touch pressure P is not applied to the second sensor 20a, a first capacitance C1 may be formed between the second sensor electrode 22 and the third sensor electrode 24.

Referring to FIG. 5B, when the touch pressure P is applied to the second sensor 20a by a user's touch or the like, the second sensor 20a may be deformed in a direction to which the touch pressure P is applied. For example, displacement may occur in the second sensor 20a in the direction (e.g., in a thickness direction of the second sensor 20a) to which the touch pressure P is applied. Accordingly, the distance between the second sensor electrode 22 and the third sensor electrode 24 may change at or around a point where the touch pressure P is applied, and accordingly the capacitance between the second sensor electrode 22 and the third sensor electrode 24 may change.

For example, when the distance between the second sensor electrode 22 and the third sensor electrode 24 changes by distance value d from the touch pressure P, the first capacitance C1 may change to the second capacitance C2. As the touch pressure P by the user's touch, or the like increases, the distance value d value may increase, so that the capacitance between the second sensor electrode 22 and the third sensor electrode 24 may increase.

Accordingly, the second sensor 20a may measure intensity of the touch pressure P based on a change amount in capacitance.

Figure 6:
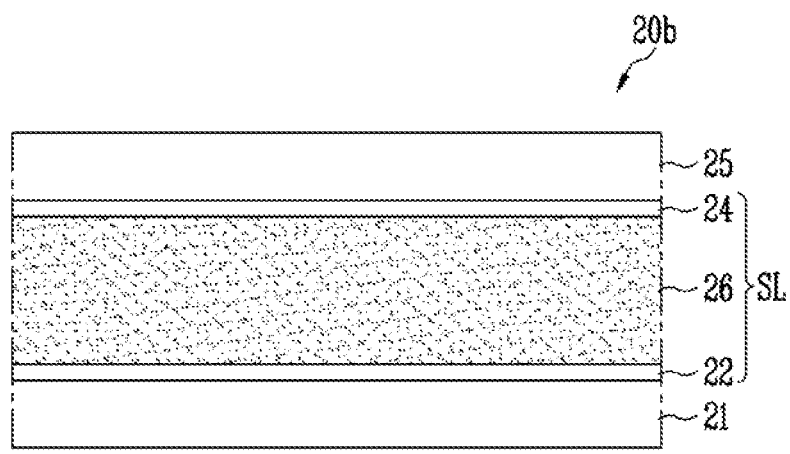
FIG. 6 is a cross-sectional view schematically illustrating another example of a second sensor included in the temperature sensor of FIG. 1.

FIG. 6 is a cross-sectional view schematically illustrating another example of a second sensor included in the temperature sensor of FIG. 1. Since the second sensor 20b of FIG. 6 is substantially the same as or similar to the second sensor 20a of FIG. 4, except for a piezoelectric layer 26 (or an intermediate layer) included in the sensor layer SL, duplicate descriptions will be omitted.

Referring to FIG. 6, the second sensor 20b may include the second and third sensor electrodes 22 and 24 disposed between the second sensor substrate 21 and the third sensor substrate 25, and a piezoelectric layer 26 disposed between the second and third sensor electrodes 22 and 24. The piezoelectric layer 26 may constitute a sensor layer SL together with the second and third sensor electrodes 22 and 24.

According to embodiments, one surface of the piezoelectric layer 26 may contact the second sensor electrode 22, and the other surface of the piezoelectric layer 26 may contact the third sensor electrode 24.

The piezoelectric layer 26 may include a piezoelectric material that exhibits a piezoelectric effect when a pressure is applied from the outside. The piezoelectric material may include lead zirconate titanate (PZT), polyvinylidene fluoride (PVDF), barium titanate (BaTiO3), polytrifluoroethylene (PTrFE), or the like. In addition, the piezoelectric material may be a piezoelectric semiconductor material such as poly crystal, piezoelectric single crystal (PMN-PT single crystal), zinc oxide (ZnO), molybdenum disulfide (MoS2), or the like. However, materials capable of constituting the piezoelectric layer 26 are not necessarily limited thereto, and the piezoelectric layer 26 may be made of other piezoelectric materials in addition to the above-described materials.

When a touch input is provided to the second sensor 20b, the piezoelectric effect may occur and characteristics of the piezoelectric layer 26 may change. Accordingly, the second sensor 20b may analyze a detection signal output from the second and/or third sensor electrodes 22 and 24 to detect a location where the characteristics of the piezoelectric layer 26 change, and an amount of the changes, thereby detecting the position where the touch input is provided and the touch pressure.

Figure 7:
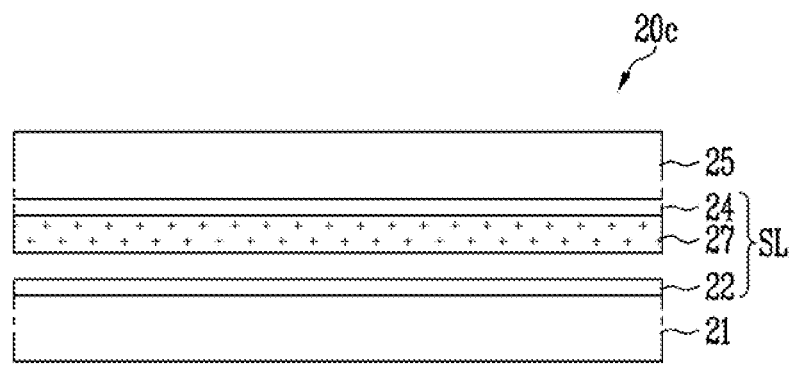
FIG. 7 is a cross-sectional view schematically illustrating another example of a second sensor included in the temperature sensor of FIG. 1.

FIG. 7 is a cross-sectional view schematically illustrating another example of a second sensor included in the temperature sensor of FIG. 1. Since the second sensor 20c of FIG. 7 is substantially the same as or similar to the second sensor 20a of FIG. 4 except for a pressure sensitive layer 27 (or an intermediate layer) included in the sensor layer SL, duplicate descriptions will be omitted.

Referring to FIG. 7, the second sensor 20c may include the second and third sensor electrodes 22 and 24 disposed between the second sensor substrate 21 and the third sensor substrate 25, and a pressure sensitive layer 27 (or a force-sensitive layer) disposed between the second and third sensor electrodes 22 and 24. The pressure sensitive layer 27 may constitute a sensor layer SL together with the second and third sensor electrodes 22 and 24.

According to embodiments, the pressure sensitive layer 27 may be provided on one surface of the second sensor electrode 22 and/or the third sensor electrode 24. For example, the pressure sensitive layer 27 may be provided on one surface of the third sensor electrode 24 and face the second sensor electrode 22, and be spaced apart from the second sensor electrode 22. In this case, a spacer may be provided between the second and third sensor substrates 21 and 25.

The pressure sensitive layer 27 may have a single-layered or multi-layered structure including materials referred to as a force sensitive material or a force sensitive resistor whose electrical properties change when pressure is applied. The force sensitive material may include nanoparticles, graphene, or quantum tunneling composite (QTC), but is not necessarily limited thereto. The nanoparticles may be provided in a form of nanotubes, nanocolumns, nanorods, nanopores, and nanowires. In addition, according to embodiments, the nanoparticles may be provided in a form distributed in a polymer.

The nanoparticles may include particles of carbon, graphite, metalloid, metal, conductive oxide of the metalloid or metal, or conductive nitride of the metalloid or metal, or may include particles of core shell structure in which the particles are coated on insulating beads or a combination thereof. The metalloid may include one of antimony (Sb), germanium (Ge), and arsenic (As), or an alloy thereof. The metals may include zinc (Zn), aluminum (Al), scandium (Sc), chromium (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide may include indium tin oxide (ITO), indium zinc oxide (IZO), aluminum doped zinc oxide (AZO), gallium indium zinc oxide (GIZO), zinc oxide (ZnO), or a mixture thereof.

When a pressure (e.g., a pressure from a touch input) is applied to the second sensor 20c, a tunnel effect between the nanoparticles provided to the pressure sensitive layer 27 causes an electron movement probability to change. Accordingly, the resistance value of the pressure sensitive layer 27 may change. Accordingly, the second sensor 20c may detect the intensity of pressure by detecting a change amount of resistance. The second sensor 20c including the pressure sensitive layer 27 may detect the pressure by the touch input even if the deformation from the touch input is minimal or nonexistent.

On the other hand, the second sensor 20 according to the embodiments may be implemented as another type of pressure sensor in addition to the types of second sensors 20a, 20b, and 20c described in the embodiments of FIGS. 5 to 7.

Figure 8:
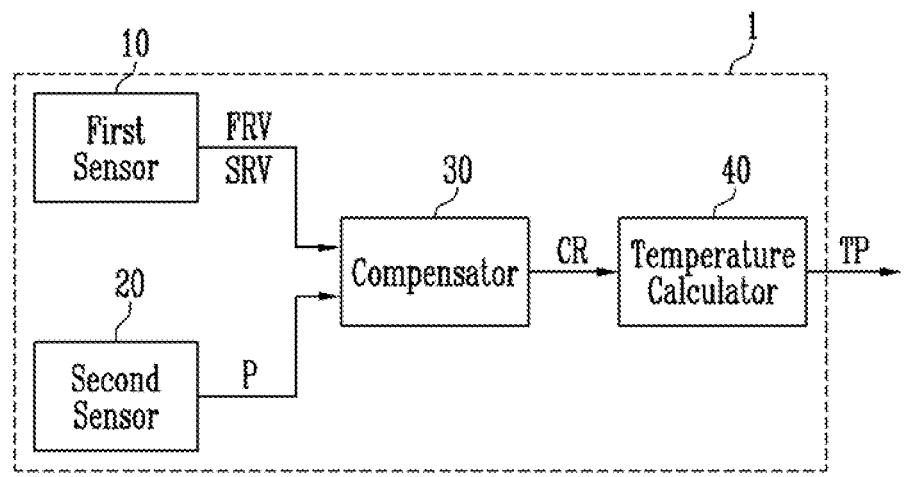
FIG. 8 is a block diagram illustrating a temperature sensor according to embodiments.

FIG. 8 is a block diagram illustrating a temperature sensor according to embodiments.

Referring to FIGS. 1, 2, and 8, the temperature sensor 1 may include a first sensor 10, a second sensor 20, a compensator 30, and a temperature calculator 40. Since the first sensor 10 and the second sensor 20 are substantially the same or similar to the first sensor 10 and the second sensor 20 described with reference to FIGS. 1 to 7, duplicate descriptions will be omitted.

According to embodiments, the first sensor 10 may measure a resistance value of the sensing element 11. For example, the first sensor 10 may measure an initial resistance value FRV (or a first resistance value) corresponding to the resistance value of the sensing element 11 in a first state (or an initial state), and a sensing resistance value SRV (or a second resistance value) corresponding to the resistance value of the sensing element 11 in a second state (or a touch state). The first state (or the initial state) may refer to a case in which a user's touch input is not provided. The second state (or touch state) may refer to a case in which a user's touch input is provided. The first sensor 10 may provide the initial resistance value FRV and the sensing resistance value SRV to the compensator 30.

According to embodiments, the second sensor 20 may measure the touch pressure P according to the user's touch in the second state and provide it to the compensator 30.

The compensator 30 may calculate a change rate of a resistance value (or a first change rate) based on the initial resistance value FRV and the sensing resistance value SRV. The first change rate may correspond to a ratio (%) of the sensing resistance value SRV to the initial resistance value FRV.

Referring to FIG. 8, the initial resistance value FRV is illustrated and described to be provided from the first sensor 10, but the present disclosure is not necessarily limited thereto. For example, the initial resistance value FRV may be prestored in a memory included in the temperature sensor 1 to correspond with characteristics of the material (e.g., polysilicon) included in the sensing element 11. For example, the initial resistance value FRV may be prestored in the memory in correspondence with the resistance value at room temperature (e.g., 15° C. to 25° C.) of the material included in the sensing element 11.

Meanwhile, as described with reference to FIG. 1, the first change rate may be a value that incorporates a resistance value change from both a temperature change and a touch pressure P.

Accordingly, the compensator 30 may calculate a correction change rate of the resistance value CR by correcting the first change rate with information from the touch pressure P in order to yield a change in the resistance value that is accurately based on the change of temperature: the correction change rate of the resistance value, CR. For example, the compensator 30 may calculate the correction change rate of the resistance value CR by applying the second change rate to the first change rate. For example, the compensator 30 may calculate of the correction change rate of the resistance value CR by subtracting the second change rate from the first change rate.

Here, the compensator 30 may calculate the change rate of the resistance value (i.e., the second change rate) according to the touch pressure P based on a first look-up table LUT prestored in memory, and may apply the second change rate to the first change rate. Here, a preset second change rate may be stored on the first look-up table according to experimental data in correspondence with the touch pressure P.

The compensator 30 may provide the calculated correction change rate of the resistance value CR to the temperature calculator 40.

The temperature calculator 40 may calculate a temperature value TP based on the correction change rate of the resistance value CR. For example, the temperature calculator 40 may calculate a temperature value TP based on a second look-up table prestored in the memory (not shown). A preset temperature value TP according to experimental data or the like may be stored on the second look-up table in correspondence with the correction change rate of the resistance value CR.

However, the configuration for calculating the temperature value TP of the temperature calculator 40 according to the present disclosure is not necessarily limited thereto, and the temperature calculator 40 may calculate the temperature value TP by using an internal algorithm, a logic circuit, or the like for calculating the temperature value TP.

Figure 9A:
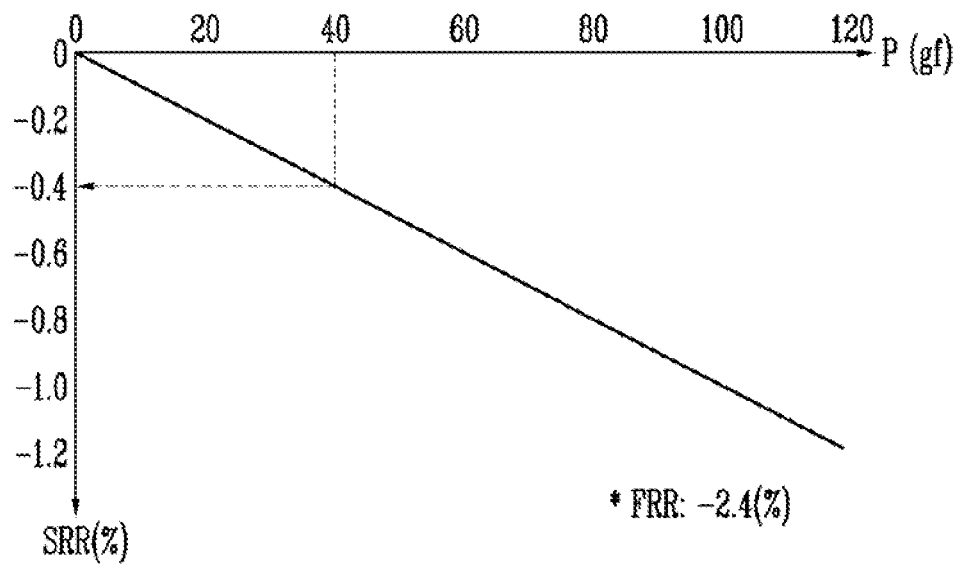
FIGS. 9A and 9B are diagrams for describing an example of an operation of the temperature sensor of FIG. 8.
Figure 9B:
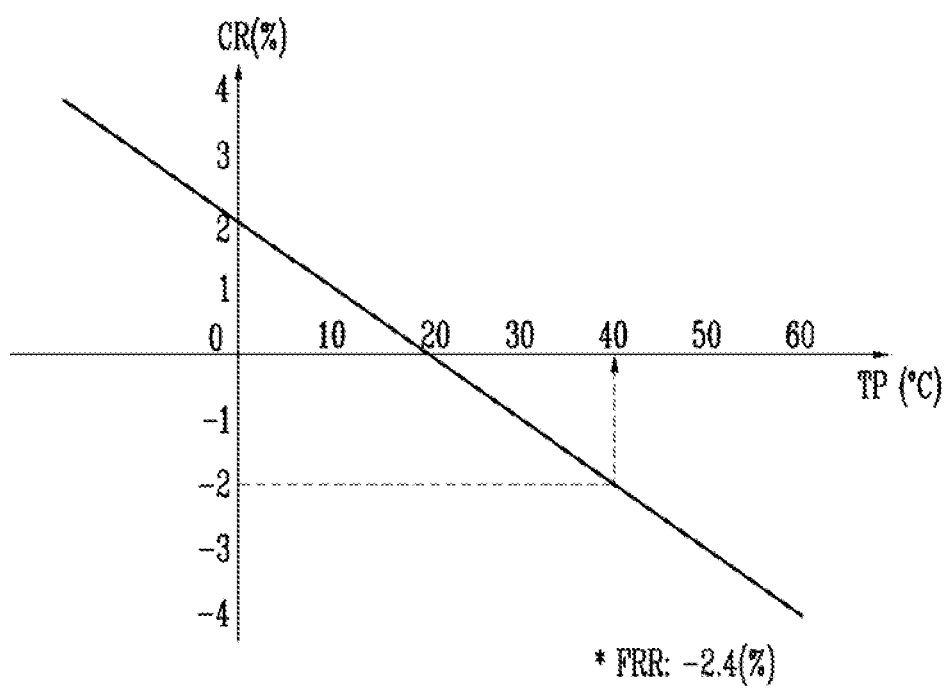

FIGS. 9A and 9B are diagrams for describing an example of an operation of the temperature sensor of FIG. 8. FIG. 9A shows a graph of the second change rate SRR corresponding to the touch pressure P. The touch pressure P and the second change rate SRR corresponding to the graph of FIG. 9A may be prestored on the first look-up table described with reference to FIG. 8. FIG. 9B shows a graph of the temperature value TP corresponding to the correction change rate of the resistance value CR. The correction change rate of the resistance value CR and the temperature value TP corresponding to the graph of FIG. 9B may be prestored on the second look-up table described with reference to FIG. 8.

Referring to FIGS. 8 and 9A, the compensator 30 may calculate the second change rate SRR according to the touch pressure P based on the first look-up table. For example, when the touch pressure P measured by the second sensor 20 is 40 (gf), the compensator 30 may calculate the second change rate SRR as −0.4(%).

The compensator 30 may calculate the correction change rate of the resistance value CR by applying the second change rate SRR to the first change rate FRR. For example, when the first change rate FRR calculated based on the initial resistance value FRV and the sensing resistance value SRV is −2.4(%), the compensator 30 may calculate the correction change rate of the resistance value CR of −2.0(%) by subtracting the second change rate SRR from the first change rate FRR.

The compensator 30 may calculate the temperature value TP according to the correction change rate of the resistance value CR based on the second look-up table. For example, the temperature value TP may be calculated as 40° C. in correspondence with the correction change rate of the resistance value CR of −2.0(%).

As described with reference to FIGS. 8 to 9B, the temperature sensor 1 according to the embodiments may calculate a temperature value TP when a user touches the temperature sensor. In an example process, the temperature sensor 1 may measure a capacitance change from a user's touch as a first change rate FRR from the first sensor 1. The temperature sensor 1 may determine a second change rate SRR from a touch pressure P by referencing a first lookup table. The temperature sensor 1 may compensate the first change rate FRR by applying the second change rate SRR to yield a correction change rate of the resistance value CR. The temperature sensor may then determine the temperature value TP from the correction change rate of the resistance value CR, by referencing a second lookup table. Accordingly, the accuracy of the temperature sensing may be improved.

Figure 10:
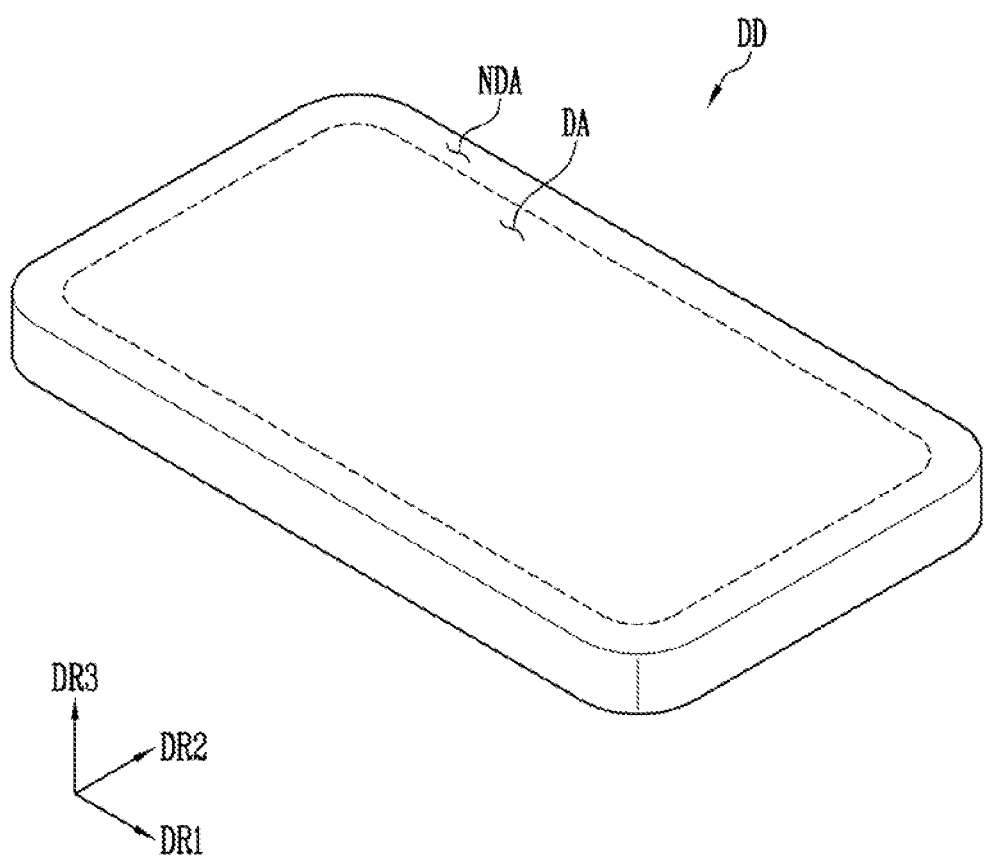
FIG. 10 is a perspective view illustrating a display device according to embodiments.
Figure 11:
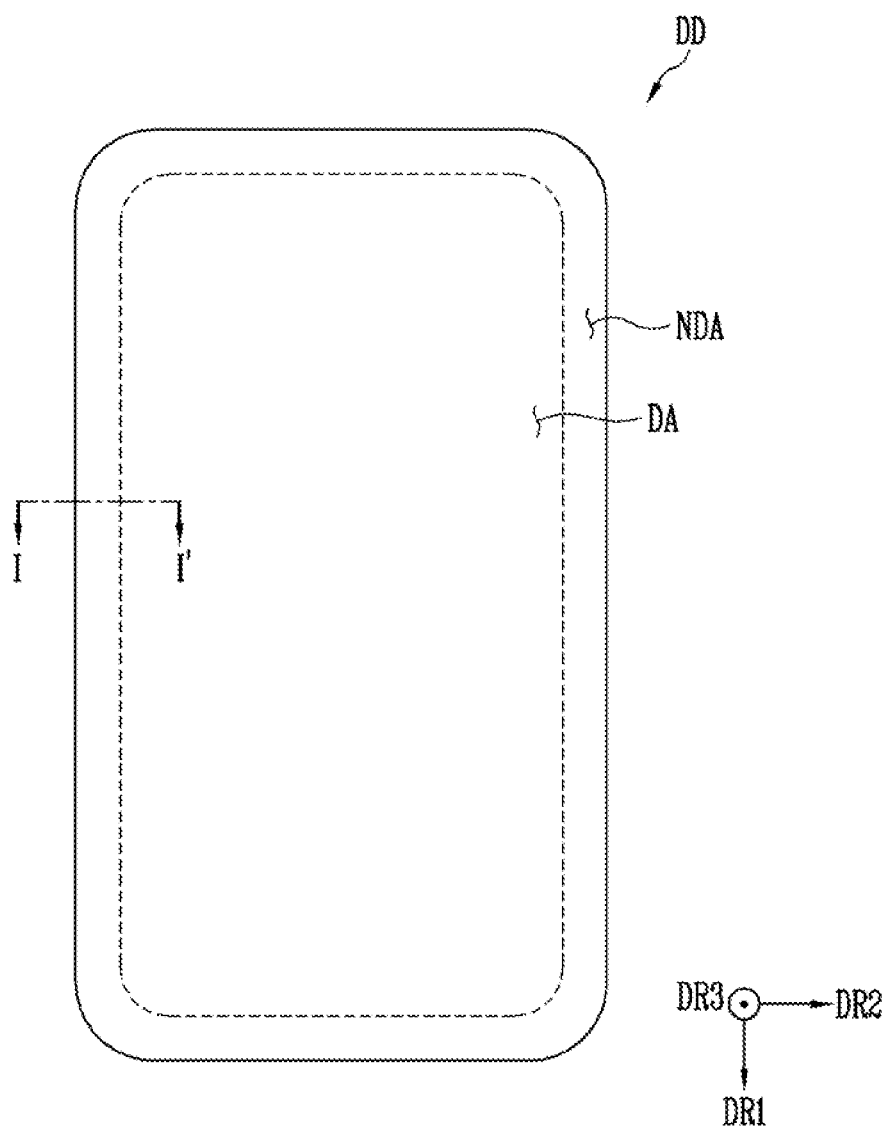
FIG. 11 is a plan view illustrating an example of the display device of FIG. 10.

FIG. 10 is a perspective view illustrating a display device according to embodiments, and FIG. 11 is a plan view illustrating an example of the display device of FIG. 10.

Referring to FIGS. 10 and 11, the display device DD may include a display area DA and a non-display area NDA.

The display area DA may be defined as an area in which an image is displayed. The display device DD may include a display panel, and the display panel may include a plurality of pixels in the display area DA.

The display device DD may display an image through the display area DA (or a front display surface). The display area DA may be parallel to a plane defined by a first direction axis (i.e., an axis extending in the first direction DR1) and a second direction axis (i.e., an axis extending in the second direction DR2). A normal direction of the display surface, that is, a thickness direction of the display device DD may be defined as the third direction DR3.

A front surface (or an upper surface) and a rear surface (or a lower surface) of each member or unit of the display device DD described later may be divided in the third direction DR3. However, the first to third directions DR1, DR2, and DR3 shown in the embodiment are examples, and the first to third directions DR1, DR2, and DR3 may be relative concepts and may be changed to other directions. Hereinafter, the first to third directions DR1, DR2, and DR3 refer to the same reference numerals.

In an embodiment, the display device DD may include a flat display area DA, but the present disclosure is not necessarily limited thereto. For example, the display device DD may include a curved display area or a three-dimensional display area.

In addition, the display area DA may be used not only as area for displaying an image, but also as an area (or a touch area) for recognizing a user's touch input. Accordingly, the display device DD may include a touch sensing unit. For example, the touch sensing unit may be disposed on the rear surface (or the lower surface) of the display panel. Here, the touch area may correspond to the display area DA, and may overlap at least a portion of the display area DA.

According to embodiments, the touch sensing unit of the display device DD may be substantially the same as the second sensor 20 described with reference to FIGS. 4 to 7. That is, the touch sensing unit may detect a position where a touch input is provided and a touch pressure in correspondence with a user's touch input.

The non-display area NDA may be defined as an area in which an image is not displayed. The non-display area NDA may be formed to surround an outside of the display area DA.

The non-display area NDA may be disposed around the display area DA. However, the present disclosure is not necessarily limited thereto, and the shape of the display area DA and the shape of the non-display area NDA may be relatively designed.

In an embodiment, the display device DD may include a temperature sensor that senses a user's temperature (a body temperature) in response to a user's touch. Here, the temperature sensor may be substantially the same as the temperature sensor 1 of FIGS. 1 and 8. That is, the temperature sensor included in the display device DD may measure the change rate of the resistance value of the sensing element and the touch pressure in response to the user's touch, and may sense the temperature by correcting the measured change rate of the resistance value of the sensing element by adjusting for the touch pressure.

For example, the temperature sensor may be formed to overlap all or part of the non-display area NDA of the display device DD. For example, the touch sensing unit may be formed to extend from the display area DA to the non-display area NDA, and the touch sensing unit disposed on the non-display area NDA may constitute the second sensor 20 of the temperature sensor 1 of FIGS. 1 and 8. In addition, the first sensor 10 may be disposed on the touch sensing unit (i.e., the second sensor 20) of the non-display area NDA to constitute the temperature sensor.

However, this and the arrangement or configuration of the second sensor 20 are not necessarily limited thereto. For example, apart from the touch sensing unit that overlaps the display area DA, the display device DD may further include a second sensor 20 formed to overlap the non-display area NDA.

For another example, the temperature sensor may be formed to overlap all or part of the display area DA of the display device DD. In this case, the touch sensing unit may be disposed on the rear surface (or the lower surface) of the display panel, and the first sensor 10 may be disposed on the front surface (or the upper surface) of the display panel. Accordingly, all or part of the touch sensing unit may constitute the second sensor 20 of the temperature sensor 1. That is, the display device DD may sense the temperature by using the touch sensing unit as a portion (i.e., the second sensor 20) of the temperature sensor 1.

According to embodiments, the first sensor 10 of the temperature sensor 1 may be disposed to not to overlap pixels of the display panel so that an image displayed in the display area DA is not interfered by the first sensor 10 of the temperature sensor 1.

Figure 12A:
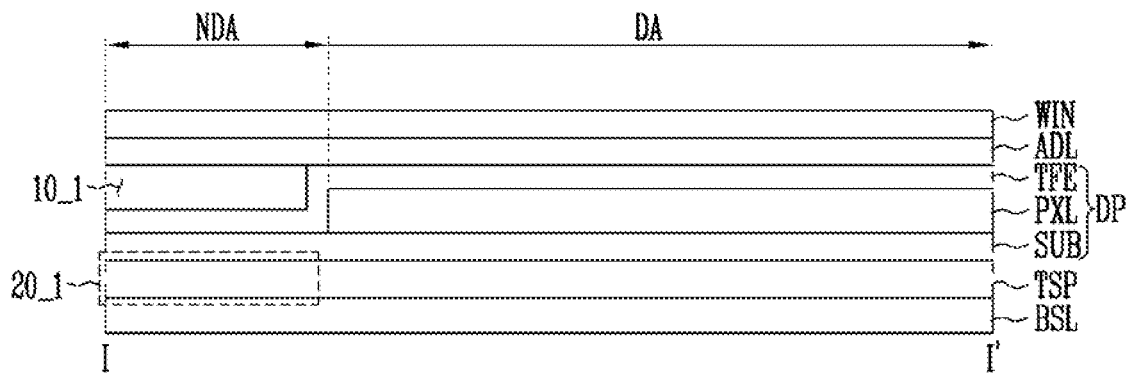
FIGS. 12A and 12B are cross-sectional views schematically illustrating examples of a portion taken along a line II-II' of the display device of FIG. 11.
Figure 12A:
Figure 12B:
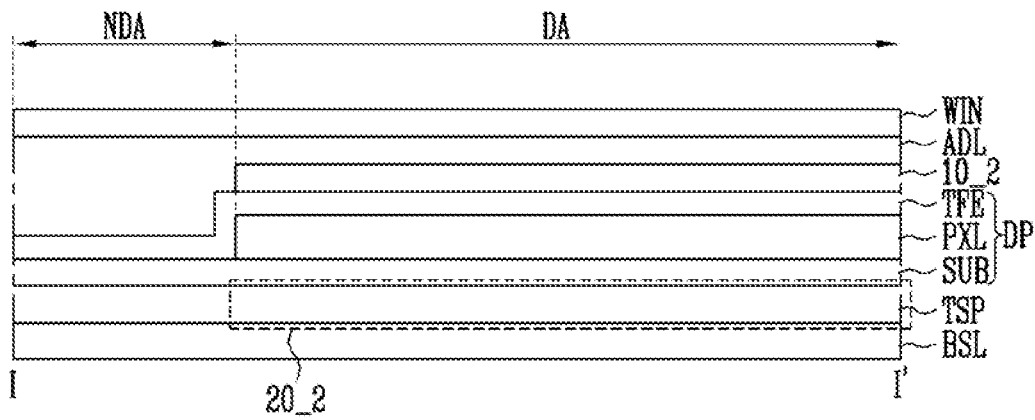
Figure 12B:

FIGS. 12A and 12B are cross-sectional views schematically illustrating examples of a portion taken along a line II-II' of the display device of FIG. 11. FIG. 12A shows that the temperature sensor 1_1 overlaps the non-display area NDA, and FIG. 12B shows that the temperature sensor 1_2 overlaps the display area DA.

Referring to FIGS. 11 and 12A, the display device DD may include a base layer BSL, a touch sensing unit TSP, a display panel DP, an adhesive layer ADL, and a window WIN.

The base layer BSL may absorb an external impact applied to a lower portion of the display device DD to protect the touch sensing unit TSP, the display panel DP, and elements of the display device DD. The base layer BSL may include a foam sheet having a predetermined elasticity. According to embodiments, the base layer BSL may be omitted.

The touch sensing unit TSP may be disposed on the base layer BSL.

The touch sensing unit TSP may sense an external input (such as a user's hand or a touch pen), change it to a predetermined input signal, and provide the input signal to the display panel DP. The touch sensing unit TSP may include a plurality of touch sensor units for sensing an external input. The display panel DP may receive an input signal from the touch sensing unit TSP, and may generate an image corresponding to the input signal.

According to embodiments, the touch sensing unit TSP may be substantially the same as the second sensor 20 described with reference to FIGS. 4 to 7.

The display panel DP may be disposed on the touch sensing unit TSP.

The display panel DP according to the embodiments may be a light emitting display panel, and the type of the display panel DP is not particularly limited. For example, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot, a quantum rod, or the like.

The display panel DP may include a substrate SUB, a pixel layer PXL disposed on the substrate SUB, and a thin film encapsulation layer TFE disposed on the substrate SUB to cover the pixel layer PXL.

The substrate SUB may be a rigid substrate or a flexible substrate capable of bending, folding, or rolling. The substrate SUB may be made of an insulating material such as glass, quartz, or polymer resin. The polymer resin may include at least one of polyethersulphone (PES), polyacrylate (PA), polyarylate (PAR), polyetherimide (PEI), polyethylene napthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof. Additionally or alternatively, the substrate SUB may include a metal material.

The substrate SUB may include the display area DA and the non-display area NDA of the display device DD. The pixel layer PXL may be disposed on the display area DA. The pixel layer PXL may include a plurality of pixels, and each of the pixels may include a light emitting element.

The thin film encapsulation layer TFE may include at least two inorganic layers and an organic layer disposed between the inorganic layers. The inorganic layers may include an inorganic material, and may protect the pixel layer PXL from moisture/oxygen. The organic layer may include an organic material, and may protect the pixel layer PXL from foreign substances such as dust particles.

The window WIN may protect the display panel DP and the touch sensing unit TSP from external scratches and impacts. The window WIN may be attached to the touch sensing unit TSP by the adhesive layer ADL, and there may be intermediary layers therebetween. Here, the adhesive layer ADL may include at least one of optical clear adhesive (OCA) and optical clear resin (OCR). The image generated by the display panel DP may pass through the window WIN to be provided to the user.

In an embodiment, the display device DD may further include a temperature sensor 1_1 overlapping and disposed on the non-display area NDA. Accordingly, the touch sensing unit TSP may be formed not only on the display area DA but also on the non-display area NDA. All or part of the touch sensing unit TSP disposed on the non-display area NDA may constitute the second sensor 20_1 of the temperature sensor 1_1.

The first sensor 10_1 may be disposed on the second sensor 20_1 (or the touch sensing unit TSP on the non-display area NDA). The first sensor 10_1 may be disposed on the substrate SUB of the display panel DP and the thin film encapsulation layer TFE to be spaced apart from the second sensor 20_1. The first sensor 10_1 may constitute a temperature sensor 1_1 together with the second sensor 20_1.

The first sensor 10_1 may be attached to the window WIN by the adhesive layer ADL.

Referring to FIGS. 11 and 12B, the display device DD may include a base layer BSL, a touch sensing unit TSP, a display panel DP, an adhesive layer ADL, and a window WIN. In FIG. 12B, descriptions overlapping FIG. 12A will not be repeated except for the configuration of the temperature sensor 1_2.

In an embodiment, the display device DD may further include a temperature sensor 1_2 overlapping and disposed on the display area DA. All or part of the touch sensing unit TSP disposed on the display area DA may constitute the second sensor 20_2 of the temperature sensor 1_2.

The first sensor 10_2 may be disposed on the second sensor 20_2 (or the touch sensing unit TSP on the display area DA). The first sensor 10_2 may be spaced apart from the second sensor 20_2. The first sensor 10_2 may constitute a temperature sensor 1_2 together with the second sensor 20_2.

In an embodiment, the first sensor 10_2 may not overlap the pixels of the display panel DP so that the image displayed in the display area DA is not interfered by the first sensor 10_2.

The first sensor 10_2 may be attached to the window WIN by the adhesive layer ADL.

The above-detailed description illustrates and explains the present inventive concepts. In addition, the above-detailed description merely illustrates embodiments, the present inventive concepts may be used in various other combinations, changes, and environments as described above, and the scope of the inventive concepts disclosed herein may be changed or modified within the scope of equivalents and/or techniques or knowledge in the art. Therefore, the above-detailed description is not intended to limit the present invention to the disclosed embodiments. In addition, the appended claims should be construed to include other embodiments.

What is claimed is:
1. A temperature sensor comprising:
a first sensor including a sensing element, wherein the first sensor is configured to measure a first resistance value of the sensing element in a first state, and wherein the first sensor is configured to measure a second resistance value of the sensing element in a second state different from the first state;

a second sensor configured to measure a touch pressure corresponding to a user's touch input in the second state;

a compensator configured to calculate a first change rate based on the first resistance value and the second resistance value, and wherein the compensator is configured to calculate a change rate of a correction resistance value by correcting the first change rate based on the touch pressure; and a temperature calculator calculating a temperature value based on the change rate of the correction resistance value.

2. The temperature sensor of claim 1, wherein the user's touch input is provided to the first sensor in the second state, and the user's touch input is not provided to the first sensor in the first state.

3. The temperature sensor of claim 1, wherein the compensator calculates the first change rate in correspondence with a ratio of the second resistance value to the first resistance value.

4. The temperature sensor of claim 1, wherein the compensator calculates a second change rate based on the touch pressure, and calculates the change rate of the correction resistance value based on the first change rate and the second change rate.

5. The temperature sensor of claim 4, wherein the compensator calculates the change rate of the correction resistance value by subtracting the second change rate from the first change rate.

6. The temperature sensor of claim 4, wherein the second change rate corresponds to a change rate of the resistance value of the sensing element according to the touch pressure.

7. The temperature sensor of claim 6, further comprising:
a memory including a look-up table in which the second change rate corresponding to the touch input is stored.

8. The temperature sensor of claim 1, further comprising:
a memory including a look-up table configured to store the temperature value corresponding to the change rate of the correction resistance value.

9. The temperature sensor of claim 1, wherein the second sensor is disposed on a surface proximate to a contact surface of the first sensor and the user.

10. The temperature sensor of claim 9, wherein the first sensor includes:
a first sensor substrate;
the sensing element disposed on the first sensor substrate;
an insulating layer disposed on the first sensor substrate and the sensing element and covering the sensing element; and
first sensor electrodes disposed on the insulating layer that pass through the insulating layer to connect to the sensing element.

11. The temperature sensor of claim 10, wherein the first sensor electrodes are connected to a measurement circuit that measures the first resistance value and the second resistance value of the sensing element.

12. The temperature sensor of claim 9, wherein the second sensor includes:

a second sensor substrate;
a third sensor substrate disposed on the second sensor substrate; and
a sensor layer disposed between the second sensor substrate and the third sensor substrate.

13. The temperature sensor of claim 12, wherein the sensor layer includes:
a second sensor electrode;
a third sensor electrode disposed on the second sensor electrode; and
an intermediate layer disposed between the second sensor electrode and the third sensor electrode.

14. The temperature sensor of claim 1, wherein the sensing element includes at least one selected from Pt, Ni, Cu, or polysilicon.

15. A display device comprising:
a touch sensing unit configured to sense a user's touch input;
a display panel disposed on the touch sensing unit, including a display area and a non-display area, and wherein the display panel is configured to display an image in the display area; and
a temperature sensor configured to calculate a temperature value in correspondence with the user's touch input,
wherein the temperature sensor includes:
a first sensor including a sensing element, wherein the first sensor is configured to measure a first resistance value of the sensing element in a first state, and wherein the first sensor is configured to measure a second resistance value of the sensing element in a second state different from the first state;
a second sensor configured to measure a touch pressure corresponding to the touch input in the second state;
a compensator configured to calculate a first change rate based on the first resistance value and the second resistance value, and wherein the compensator is configured to calculate a change rate of a correction resistance value by correcting the first change rate based on the touch pressure; and
a temperature calculator calculating a temperature value based on the change rate of the correction resistance value.

16. The display device of claim 15, wherein the temperature sensor overlaps the non-display area.

17. The display device of claim 16, wherein the touch sensing unit overlaps the display area and the non-display area,
the touch sensing unit overlapping the non-display area corresponds to the second sensor, and
the first sensor overlaps the second sensor.

18. The display device of claim 15, wherein the temperature sensor overlaps the display area.

19. The display device of claim 18, wherein the touch sensing unit overlaps the display area,
the touch sensing unit overlapping the display area corresponds to the second sensor, and
the first sensor overlaps the second sensor.

20. The display device of claim 19, wherein the display panel includes pixels disposed on the display area, and
wherein the first sensor does not overlap the pixels.

* * * * *